United States Patent
Kohda

(10) Patent No.: US 7,028,982 B2
(45) Date of Patent: Apr. 18, 2006

(54) COUPLING MEMBER FOR A PIPE COUPLING

(75) Inventor: Toru Kohda, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 0 days.

(21) Appl. No.: 10/971,955

(22) Filed: Oct. 22, 2004

(65) Prior Publication Data

US 2005/0087240 A1    Apr. 28, 2005

(30) Foreign Application Priority Data

Oct. 22, 2003    (JP)    ............................ 2003-361382

(51) Int. Cl.
*F16L 37/28* (2006.01)
(52) U.S. Cl. ............................ 251/149.2; 137/614.03; 137/614.01; 137/614.05
(58) Field of Classification Search ........... 137/614.03, 137/614.05, 614.01; 251/149.2
See application file for complete search history.

(56) References Cited

U.S. PATENT DOCUMENTS

| 4,473,211 | A | | 9/1984 | Fremy |
| 4,664,149 | A | * | 5/1987 | Fremy ................. 137/614.05 |
| 2005/0087239 | A1 | | 4/2005 | Kohda |
| 2005/0087241 | A1 | | 4/2005 | Kohda |

FOREIGN PATENT DOCUMENTS

| JP | S58-160692 A | 9/1983 |
| JP | 2004-211739 A | 7/2004 |

* cited by examiner

*Primary Examiner*—Kevin Lee
(74) *Attorney, Agent, or Firm*—Brinks Hofer Gilson & Lione

(57) ABSTRACT

A coupling member has a spherical rotatable valve member is operatively installed therein so as to be movable in an axial direction of the coupling member, and so as also to be rotatable between the opening rotational position and a closing rotational position under a control of a cam mechanism comprising a pin and a cam hole formed in the rotatable valve member and slidably engaged with the pin. The coupling member further comprises a stopper to be engaged with the rotational valve member to hold it into the opening rotational position and a spring member for urging the rotatable valve member against the stopper via the pin.

7 Claims, 3 Drawing Sheets

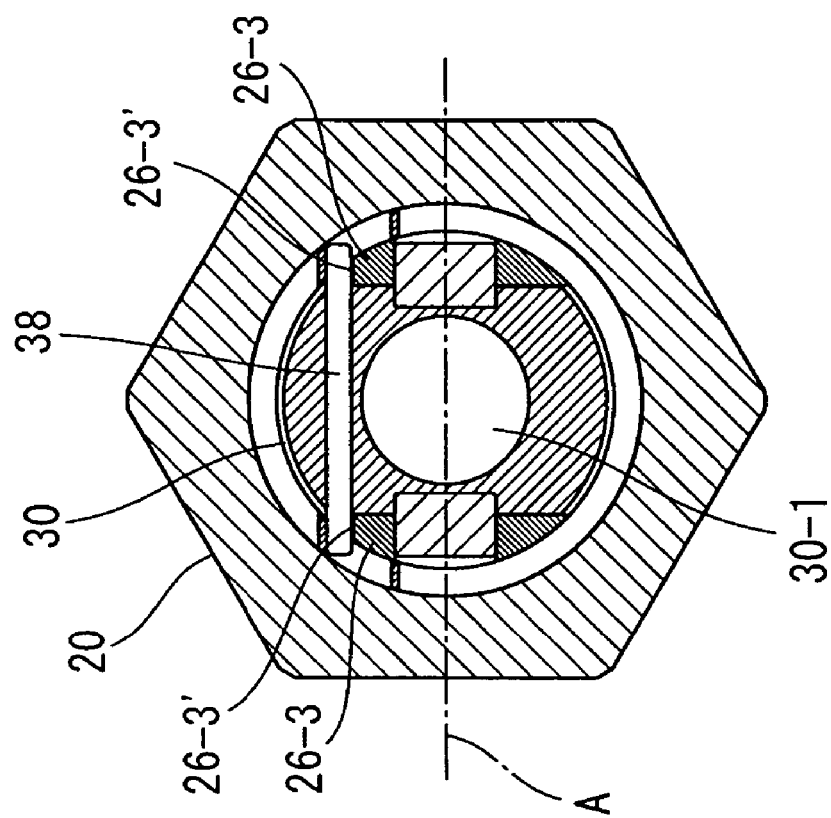

COUPLING MEMBER FOR A PIPE COUPLING

This application claims priority under 35 U.S.C. § 119 to Japanese Patent Application No. 2003-361382 filed Oct. 22, 2003, the entire content of which is hereby incorporated by reference. This application is also related to U.S. patent application Ser. Nos. 10/971,368 and 10/971,963, both naming Toru Kohda as the sole inventor, filed on Oct. 22, 2004, the entire specifications of which are incorporated herein by reference for all purposes as if fully set forth herein.

BACKGROUND OF THE INVENTION

The present invention relates to a coupling member for a pipe coupling, the coupling member including a male coupling member and a female coupling member.

Various types of coupling members are available for use in pipe couplings. One known type has a configuration such that each of a male coupling member and a female coupling member comprises, a tubular body, a valve holder configured to be movable within a hole formed through the tubular body in the direction of an axis of the through hole, a spherical valve member supported by the valve holder to be rotatable about a pivotal axis extending normal to the axial direction of the through hole, and a cam mechanism for causing a rotational motion of the spherical valve member about the pivotal axis in association with the movement of the valve holder along the axial direction of the through hole, wherein when the male and the female coupling members are to be interconnected with each other, the valve holders of each of the coupling members are urged against one another so to be placed into the through holes of the tubular bodies to receive the valve holders; and in association with this action, each of the spherical valve members is rotated by the cam mechanism into its opening rotational position for allowing a fluid to flow through the coupling member. Conversely, when the coupling members are to be disconnected from each other, each of the valve holders is pushed back under a spring force, and in association with this action, each of the spherical valve members is rotated by the cam mechanism into its closing rotational position whereby the fluid is prevented from flowing through the through hole of the coupling member. The cam mechanism in this configuration, by way of example, may comprise, a pin installed to traverse the through hole of the tubular body with its opposite ends being supported by the interior wall of the tubular body, and a cam hole formed in the spherical valve member for receiving the pin therethrough such that when the spherical valve member is moved, the cam hole may be slidably engaged with the pin to cause rotational motion of the spherical valve member (see, for example, Japanese Patent Laid-open Publication No. Sho 58-160692).

SUMMARY OF THE INVENTION

In a coupling member having such a cam mechanism, the closing rotational position of the spherical valve member depends on a position of engagement between the pin and the cam hole.

However, based on the consideration that the pin and the cam hole are to be slidably moved with respect to each other, some degree of play is required in the engagement therebetween so as to ensure a smooth sliding motion. However, this requirement gives rise to a problem that when the male coupling member and the female coupling member are connected with one another, there is a possibility that the spherical valve member may not be securely held at its opening rotational position, with the result that the flow passage may become partially blocked.

The present invention has been made in light of the above points, and an object thereof is to provide a pipe coupling member in which a spherical valve member is able to be securely held at its open rotational position in a state where the coupling member has been disengaged from another coupling member.

In order to accomplish the object described above, the present invention provides a coupling member for a pipe coupling comprising:
  a tubular body having a through hole; and,
  a valve disposed in the through hole, wherein
  the valve comprises:
    a valve holder movable in a direction of an axis of the through hole between a closing position and an opening position; and
    a rotatable valve member supported by the valve holder to be rotatable about a pivotal axis extending normal to the axis of the through hole between an opening rotational position to allow fluid to flow through the coupling member and a closing rotational position to prevent fluid from flowing through the coupling member; and
  the coupling member further comprises:
    a cam mechanism for operating the movable valve member, the cam mechanism comprising a cam member disposed at a predetermined position in the tubular body, and a cam profile portion provided on the rotatable valve member and slidably engaging with the cam member such that, when the valve holder is moved between the opening position and the closing position, the rotatable valve member is rotated about the pivotal axis between an opening rotational position and a closing rotational position, respectively; and
    a stopper engaging the rotatable valve member when the rotatable valve member has been moved from the closing rotational position to the opening rotational position to stop the rotational valve member at the opening rotational position; and,
    a spring member for urging the rotatable valve member against the stopper.

It is to be noted that the valve holder may include the stopper.

In this coupling member, when the valve holder is moved into the opening position, the rotatable valve member abuts against the stopper to thereby establish the closing rotational position of the rotatable valve member, and at the same time, the spring member for the rotatable valve member urges the rotatable valve member against the stopper to thereby ensure that the rotatable valve member is held at the closing rotational position.

In one embodiment of the coupling member of the present invention, the spring member may urge the cam member against the rotatable valve member to apply a rotational moment to the rotatable valve member to urge it against the stopper.

Further, the cam profile portion may be formed as a cam hole which extends through the rotatable valve member in a direction of the pivotal axis, and extends in a plane normal to the pivotal axis along a given cam profile; and the cam member may comprise a straight pin extending through the cam hole.

Specifically, in an embodiment of the coupling member of the present invention,
  the spring member is in the shape of a ring and positioned around the rotatable valve member moved to the opening rotational position;
  the tubular body comprises a tubular coupling member body having an axial forward end and an axial rearward end and a tubular adapter connected to the axial rearward end of the tubular coupling member body for connecting a conduit to the coupling member, the tubular coupling member body having an interior surface defining a part of the through hole of the tubular body and an adapter-receiving portion positioned rearwards of the part of the through hole to securely receive the tubular adapter having an interior surface defining the rest of the through hole;

the interior surface of the tubular coupling member body has an annular shoulder portion facing rearwards and surrounding the rotatable valve member; and the spring member has a first portion engaged with the annular shoulder portion, second portions extending radially inwards and rearwards from the first portion to resiliently abut against a forward end of the adapter received in and connected to the adapter-receiving portion so that the spring member is held between the annular shoulder portion and the forward end of the adapter.

Further specifically, in another embodiment of the coupling member of the present invention, opposite ends of the pin are loosely fitted in spaces each enclosed by the second portions of the spring, the annular shoulder portion formed in the interior surface of the through hole of the coupling member body and the valve holder, and when the rotatable valve member is displaced between the opening rotational position and the closing rotational position, the pin is engaged with a wall surface of the cam hole of the rotatable valve member and also is engaged with the second portions of the spring defining the space to thereby apply a reaction force to the wall surface of the cam hole and thus to apply a rotational moment to the rotatable valve member about the pivotal axis.

Further, in another embodiment of the coupling member of the present invention, the valve holder comprises a forward tubular portion and a rearward tubular portion, as defined along the axis of the tubular body from the forward end towards the rearward end, and also an intermediate portion interconnecting the forward and the rearward tubular portions;

the rotatable valve member is supported to be rotatable in the intermediate portion and includes an outer surface defining a spherical shape and a truncated surface portion formed to be normal to a through hole of the rotatable valve member;

a stopper is formed in a forward end peripheral edge of the rearward tubular portion protruding forward from the forward end peripheral edge; and when the rotatable valve member is rotated from the closing rotational position into the opening rotational position, the truncated surface portion is engaged with and stopped by the stopper, and the valve urging spring member attached to the tubular body biases the rotatable valve member to urge the truncated surface portion against the stopper.

BRIEF DESCRIPTION OF THE DRAWINGS

FIG. 3 is a sectional view taken along the line III—III of FIG. 2.

DESCRIPTION OF THE PREFERRED EMBODIMENTS

A coupling member according to the present invention will now be described with reference to the attached drawings.

Figure 1:
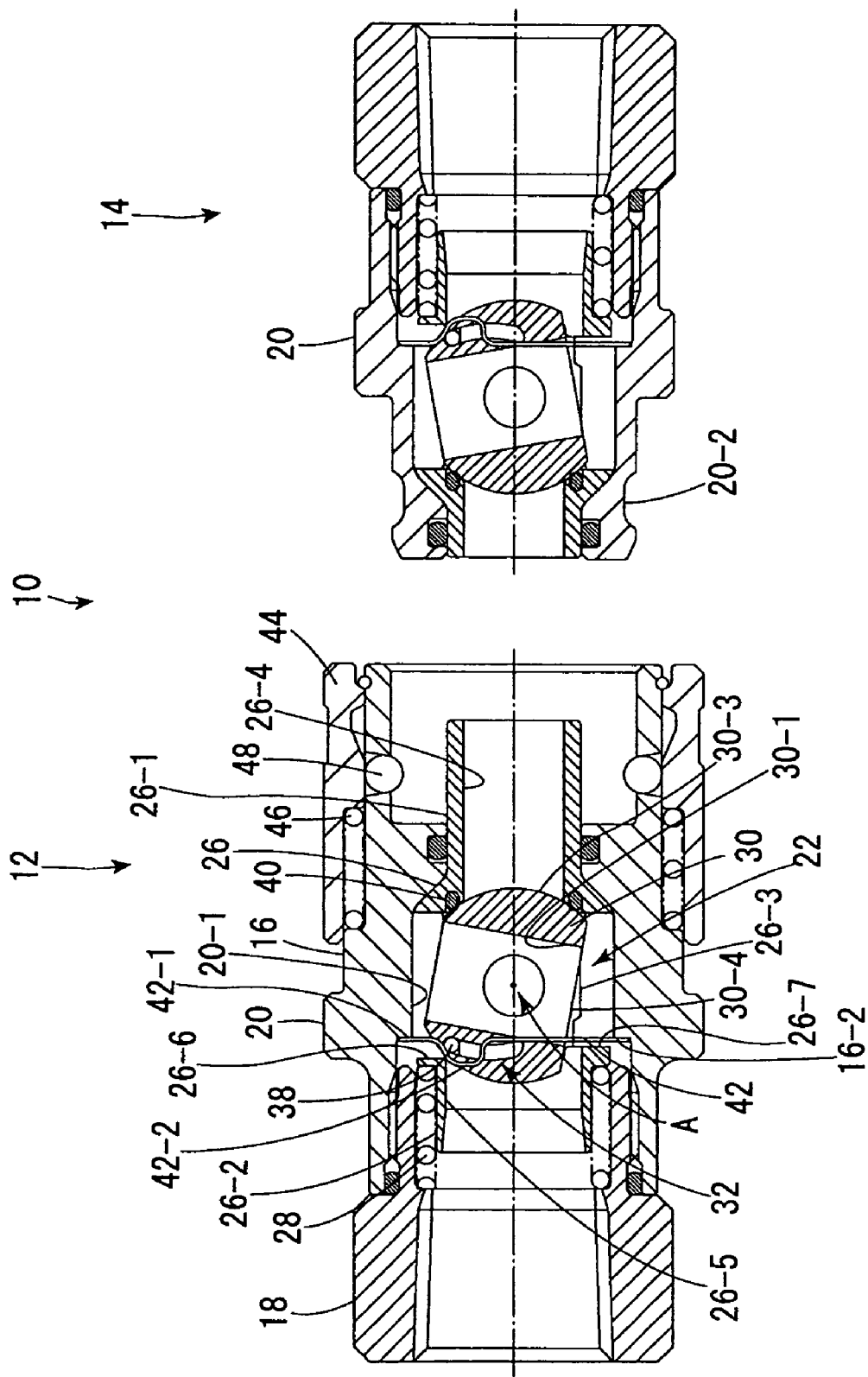
FIG. 1 is a longitudinal sectional view of a pipe coupling comprising a male coupling member and a female coupling member according to the present invention, showing a state where the male and the female coupling member are disconnected from each other.
Figure 2:
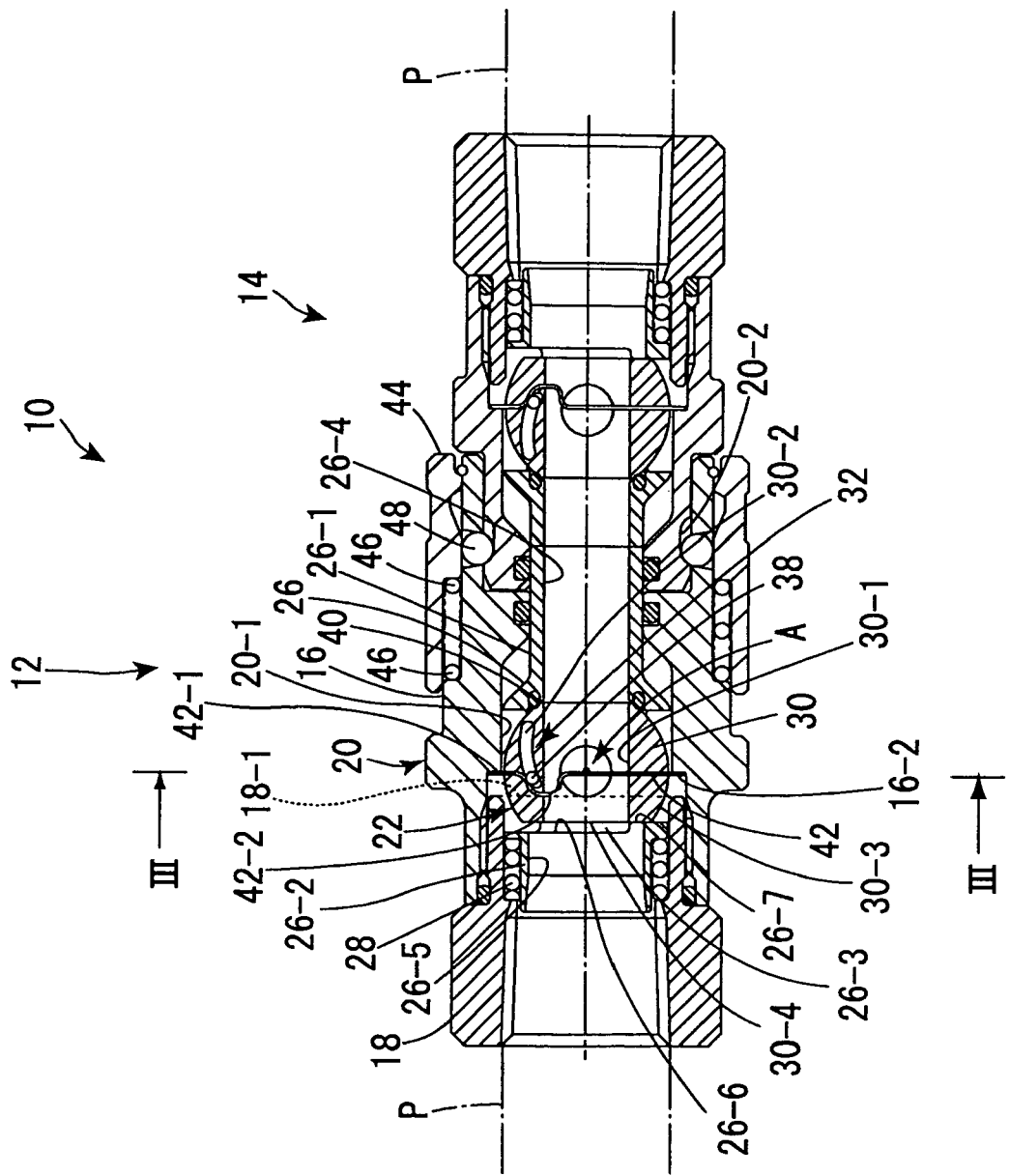
FIG. 2 is a longitudinal sectional view of the same pipe coupling, showing a state where the male and the female coupling members are connected with each other.

FIGS. 1 and 2 show a pipe coupling 10 comprising a female and a male coupling members 12, 14 according to the present invention.

The female coupling member 12 comprises a tubular body 20 including a tubular coupling member body 16 and a tubular adapter 18 connected to a rearward end of the coupling member body and serving to connect the coupling member 12 with a conduit P, and a valve 22 disposed in a through hole 20-1 extending through the tubular body to be movable in a direction of an axis of the through hole.

The valve 22 comprises a valve holder 26 movable in the axial direction of the through hole, a spring member 28 for urging the valve holder towards the forward end of the tubular body 20, and a rotatable valve member 30 supported by the valve holder 26 to be rotatable about a pivotal axis A extending in a direction normal to the axis of the tubular body 20.

The valve holder 26 comprises a forward tubular portion 26-1, a rearward tubular portion 26-2 and an intermediate portion comprising a pair of left and right side walls 26-3, 26-3 (only one of them is illustrated in FIGS. 1 and 2) extending between the forward and the rearward tubular portions for interconnecting them, in which the rotatable valve member 30 is supported by the left and the right side walls 26-3, 26-3 to be rotatable about the pivotal axis A. The rotatable valve member 30 has a through hole 30-1 extending in a direction normal to the pivotal axis.

A cam mechanism 32 is operatively provided between the valve 22 and the tubular body 20 such that the rotatable valve member 30 can rotate about the pivotal axis A, as the valve holder 26 moves along the axial direction of the through hole. Specifically, the cam mechanism 32 comprises a cam hole 30-2 formed to pass through the rotatable valve member 30 in the direction parallel to the pivotal axis and to follow a desired cam curve in its cross-sectional surface extending normal to the pivotal axis, and a straight pin 38 extending through the cam hole 30-2 in the direction of the pivotal axis, in which opposite ends of the pin 38 are loosely fitted within spaces enclosed by upper horizontal surfaces 26-3', 26-3' defined in the left and the right side walls 26-3, 26-3 respectively and a valve urging spring member 42 (which will be described later) (and an annular shoulder portion 16-2 facing towards the rearward end of the coupling member body 16, which will be also described later). When the valve holder 26 is moved in the axial direction of the through hole, the rotatable valve member 30 which is configured to move in the axial direction in association with the valve holder 26 is rotated about the pivotal axis A with the wall surfaces of the cam hole 30-2 formed therein sliding on the pin 38. That is, the pin 38 is configured to be loosely fitted at opposite ends thereof in the above-mentioned spaces, brought into contact with the wall surface of the cam hole 30-2, displaced appropriately, and further engaged with the valve member urging spring 42 or the like defining the spaces to thereby provide the rotatable valve member 30 with a rotational moment about the pivotal axis via the wall surface of the cam hole 30-2. Since the pin 38 is not fixedly attached but allowed to be displaced appropriately, no excessive force is generated between the pin 38 and the wall surface of the cam hole 30-2, and accordingly the rotatable valve member 30 is able to rotate smoothly.

In a state as illustrated in FIG. 1 where the female coupling member 12 and the male coupling member 14 have been disconnected and thus separated from each other, the valve 22 has been urged by the spring member 28 towards the forward end of the tubular body 20 to be placed in a closing position, and in this closing position, the rotatable valve member 30 is in a closing rotational position, wherein a through hole 30-1 of the rotatable valve member 30 is not aligned with through holes 26-4 and 26-5 of the forward and the rearward tubular portions 26-1 and 26-2 of the valve holder 26, and an outer surface 30-3 defining a spherical surface of the rotatable valve member 30 is sealingly engaged with an O-ring 40 disposed circumferentially around the rearward opening of the forward tubular portion 26-1 so as to block flow of fluid through the valve 22.

In a state as illustrated in FIG. 2 where the female coupling member 12 and the male coupling member 14 have been interconnected, the valve 22 has been placed in an opening position defining a state where the valve 22 has been moved rearward or leftwards as viewed in FIGS. 1 and 2 against the force exerted by the spring member 28, and in this opening position, the rotatable valve member 30 is in an opening rotational position, wherein the through hole 30-1 of the rotatable valve member 30 is aligned with the through holes 26-4 and 26-5 of the forward and the rearward tubular portions 26-1 and 26-2 of the valve holder 26 so as to allow the fluid to flow through the valve 22.

As the valve 22 is moved from the closing position as shown in FIG. 1 into the opening position as shown in FIG. 2, the wall surface of the cam hole 30-2 is slidably engaged with the pin 38, so that the rotatable valve member 30 is now subject to rotational moment in a clockwise direction under a reaction force from the pin and forced to rotate from the closing rotational position to the opening rotational position. Conversely, as the valve 22 is moved from the opening position as shown in FIG. 2 into the closing position as shown in FIG. 1, the wall surface of the cam hole 30-2 is slidably engaged with the pin 38, so that the rotatable valve member 30 is now under the rotational moment in a counterclockwise direction under the reaction force from the pin and thus forced to rotate from the opening rotational position into the closing rotational position.

A basic configuration of the female coupling member 12 according to the present invention has been described, and it is further characterized in the following features.

For the sake of explanation it is to be noted that a part (a lower portion in the drawing) of a forward end surface 26-6 of the rearward tubular portion 26-2 of the valve holder 26 extends forward and forms a stopper 26-7 for the rotatable valve member 30; while, on the other hand, the rotatable valve member 30 has a truncated surface portion 30-4 formed to be normal to the through hole 30-1 thereof, in which the truncated surface portion 30-4, when in the opening rotational position (FIG. 2) of the rotatable valve member, is brought into face-to-face engagement with the stopper 26-7 to be held stationary in the same location. In addition, an interior surface of the through hole of the coupling member body 16, which has been configured to surround the periphery of the rotatable valve member 30 in its opening rotational position, is provided with an annular shoulder portion 16-2 facing towards the rearward end of the coupling member body 16, and the valve urging spring member 42 having an annular shape to surround the periphery of the rotatable valve member 30 is disposed between the shoulder portion 16-2 and a forward end peripheral edge 18-1 of an adapter 18 so as to be engaged with the pin 38. Specifically, the valve urging spring member 42 is made of a thin spring member into a form comprising an annular shoulder abutting portion 42-1 which is brought into abutment against the shoulder portion 16-2 and an adapter abutting portion 42-2 which is bent from the annular portion 42-1 towards the rearward end of the female coupling member 12 so as to come in abutment against the forward end peripheral edge surface 18-1 of the adapter 18, and held and clamped between the shoulder portion 16-2 and the forward end peripheral edge surface 18-1 of the adapter 18. The adapter abutting portion 42-2 is arranged at each of two locations spaced circumferentially along the annular shoulder abutting portion 42-1 (only one of them is illustrated in the drawing); and the adapter abutting portions 42-2 rising from the annular shoulder abutting portion 42-1 towards the rearward end of the female coupling member 12, together with the shoulder portion 16-2 and the upper horizontal surfaces 26-3' and 26-3' of the left and the right side walls 26-3 and 26-3 define the spaces for holding the opposite ends of the pin 38. During the rotatable valve member 30 being rotated towards the opening rotational position, starting effectively from a stage just prior to a time when the truncated surface portion 30-4 of the rotatable valve member 30 is urged against the stopper 26-7, the pin 38 tends to be urged by the wall surface of the cam hole 30-2 against the valve member urging spring 42 under a force that gradually increases in strength, and in a state where the truncated surface portion 30-4 of the rotatable valve member 30 has been urged against the stopper 26-7, the rotatable valve member 30 is held stable so as not to move away from the stopper, even if a significant variation in fluid pressure occurs, whereby the through hole of the rotatable valve member 30 can be held open.

The male coupling member 14 has basically a similar configuration to that of the female coupling member 12, and main components of the male coupling member 14 equivalent to those in the female coupling member 12 are designated by the same reference numerals in FIGS. 1 and 2.

To connect the male coupling member 14 with the female coupling member 12 which have been placed in the state shown in FIG. 1, an operating sleeve 44 disposed over the outer periphery of the female coupling member 12 is retracted against a force exerted by a spring member 46 to prepare a condition for allowing a locking ball 48 to be displaced outward in a radial direction, and then the forward end portion of the male coupling member 14 is inserted into the forward end portion of the female coupling member 12 to make a connection. During this operation, the valves 22, 22 of the female and the male coupling members are brought into abutment against each other at their forward end surfaces and are retracted against forces exerted by the spring members 28, 28, respectively, and thereby, as described above, the rotatable valve members 30, 30 are moved from the closing rotational positions to the opening rotational positions, respectively, and at this point in time, the operating sleeve 44 is returned to its original position so that the locking ball 48 that has rested within a locking recessed portion 20-2 formed on an outer surface of the tubular body 20 of the male coupling member 14 may be pressed from outside in the radial direction to be held stationary. To disconnect the female coupling member from the male coupling member, the operating sleeve 44 is retracted against the force exerted by the spring member 46 and the male coupling member is then pulled out of the female coupling member.

It should be noted that the present invention is not necessarily limited to the foregoing embodiment but can be modified in a variety of ways without departing from the gist of the present invention.

What is claimed is:
1. A coupling member for a pipe coupling comprising:
a tubular body having a through hole; and
a valve disposed in said through hole, wherein
said valve comprises:

a valve holder movable in a direction of an axis of said through hole between a closing position and an opening position; and
a rotatable valve member supported by said valve holder to be rotatable about a pivotal axis extending normal to said axis of said through hole between an opening rotational position to allow fluid to flow through said coupling member and a closing rotational position to prevent fluid from flowing through said coupling member, and said coupling member further comprises:

a cam mechanism for operating said movable valve member, said cam mechanism comprising:
a cam member disposed at a predetermined position in said tubular body, and a cam profile portion provided on said rotatable valve member to be slidably engagable with said cam member such that, when said valve holder is moved between said opening position and said closing position, said rotatable valve member is rotated about said pivotal axis between said opening rotational position and said closing rotational position, respectively;
a stopper engaging said rotatable valve member when the rotatable valve member has been moved from said closing rotational position to said opening rotational position to stop said rotational valve member at said opening rotational position; and
a spring member for urging said rotatable valve member against said stopper.

2. A coupling member as set forth in claim 1 wherein said valve holder includes said stopper.

3. A coupling member as set forth in claim 1 wherein said spring member urges said cam member against said rotatable valve member to apply a rotational moment to said rotatable valve member with the rotational valve member being urged against said stopper.

4. A coupling member as set forth in claim 1 wherein:
said cam profile portion is formed as a cam hole which extends through said rotatable valve member in a direction of said pivotal axis A and extends in a plane normal to said pivotal axis along a given cam profile; and
said cam member comprises a straight pin extending through said cam hole.

5. A coupling member as set forth in claim 1 wherein:
said spring member is in the shape of a ring and is positioned around said rotatable valve member moved to said opening rotational position;
said tubular body comprises a tubular coupling member body having an axial forward end and an axial rearward end and a tubular adapter connected to said axial rearward end of said tubular coupling member body for connecting a conduit to said coupling member, said tubular coupling member body having an interior surface defining a part of said through hole of said tubular body and an adapter-receiving portion positioned rearwards of said part of said through hole to securely receive said tubular adapter having an interior surface defining the rest of said through hole;
said interior surface of said tubular coupling member body has an annular shoulder portion facing rearwards and surrounding said rotatable valve member; and
said spring member has a first portion engaged with said annular shoulder portion, a second portion bent rearwards from said first portion to resiliently abut against a forward end of said adapter received in and connected to said adapter-receiving portion so that the spring member is held between said annular shoulder portion and said forward end of said adapter.

6. A coupling member as set forth in claim 4 wherein:
said spring member is in the shape of a ring and is positioned around said rotatable valve member moved to said opening rotational position;
said tubular body comprises a tubular coupling member body having an axial forward end and an axial rearward end and a tubular adapter connected to said axial rearward end of said tubular coupling member body for connecting a conduit to said coupling member, said tubular coupling member body having an interior surface defining a part of said through hole of said tubular body and an adapter-receiving portion positioned rearwards of said part of said through hole to securely receive said tubular adapter having an interior surface defining the rest of said through hole;
said interior surface of said tubular coupling member body has an annular shoulder portion facing rearwards and surrounding said rotatable valve member;
said spring member has a first portion engaged with said annular shoulder, second portions extending radially inwards and rearwards from said first portion to resiliently abut against a forward end of said adapter received in and connected to said adapter-receiving portion so that the spring member is held between said annular shoulder portion and said forward end of said adapter; and
opposite ends of said pin are loosely fitted in spaces each enclosed by said second portions of said spring, said annular shoulder portion formed in the interior surface of the through hole of said coupling member body and said valve holder, and when said rotatable valve member is displaced between said opening rotational position and said closing rotational position, said pin is engaged with a wall surface of said cam hole of said rotatable valve member and also engaged with said second portions of said spring defining said space to thereby apply a reaction force to the wall surface of said cam hole and apply a rotational moment to said rotatable valve member about said pivotal axis.

7. A coupling member as set forth in claim 1 wherein:
said valve holder comprises a forward tubular portion and a rearward tubular portion, as defined along said axis of said tubular body from the forward end towards the rearward end, and also an intermediate portion interconnecting said forward and said rearward tubular portions;
said rotatable valve member is supported to be rotatable in said intermediate portion and includes an outer surface defining a spherical shape and a truncated surface portion formed to be normal to a through hole of said rotatable valve member;
said stopper is formed in a forward end peripheral edge of said rearward tubular portion protruding forward from said forward end peripheral edge; and
when said rotatable valve member is rotated from said closing rotational position into said opening rotational position, said truncated surface portion is engaged with and stopped by said stopper, and
said spring member attached to said tubular body biases said rotatable valve member to urge said truncated surface portion against said stopper.

* * * * *